United States Patent
Sekiya et al.

(10) Patent No.: US 9,106,174 B2
(45) Date of Patent: Aug. 11, 2015

(54) ROTARY ELECTRICAL MACHINE CONTROL DEVICE

(75) Inventors: Takaomi Sekiya, Anjo (JP); Subrata Saha, Anjo (JP); Mitsuru Nakamura, Hekinan (JP); Arinori Shimada, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 63 days.

(21) Appl. No.: 14/112,390

(22) PCT Filed: Jun. 15, 2012

(86) PCT No.: PCT/JP2012/065361
§ 371 (c)(1),
(2), (4) Date: Oct. 17, 2013

(87) PCT Pub. No.: WO2013/002043
PCT Pub. Date: Jan. 3, 2013

(65) Prior Publication Data
US 2014/0232304 A1 Aug. 21, 2014

(30) Foreign Application Priority Data
Jun. 28, 2011 (JP) ................................. 2011-143292

(51) Int. Cl.
*H02P 7/00* (2006.01)
*H02P 21/00* (2006.01)
(Continued)

(52) U.S. Cl.
CPC ............ *H02P 21/0092* (2013.01); *B60L 3/003* (2013.01); *B60L 3/0046* (2013.01); *B60L 3/0061* (2013.01); *H02P 3/18* (2013.01); *Y02T 10/643* (2013.01)

(58) Field of Classification Search
CPC ............. H02P 3/14; H02P 6/08; H02P 21/00; H02P 21/005; H02P 21/0089; H02P 21/14
See application file for complete search history.

(56) References Cited

U.S. PATENT DOCUMENTS

| 2004/0095784 A1* | 5/2004 | Zhou ................................ 363/37 |
| 2008/0007190 A1* | 1/2008 | Kunii et al. .................... 318/141 |

(Continued)

FOREIGN PATENT DOCUMENTS

| JP | A-05-130794 | 5/1993 |
| JP | A-2008-199716 | 8/2008 |

(Continued)

OTHER PUBLICATIONS

International Search Report issued in Application No. PCT/JP2012/065361; Dated Sep. 11, 2012 (With Translation).

*Primary Examiner* — Karen Masih
(74) *Attorney, Agent, or Firm* — Oliff PLC

(57) ABSTRACT

An inverter control section controls the inverter by controlling an armature current in a two-axis orthogonal coordinate system that rotates in synchronization with the rotary electric machine, the armature current being a vector obtained by synthesizing a field current and a drive current extending along respective axes of the orthogonal coordinate system. If it is determined that connection between the DC power source section and the inverter is in a blocked state, the inverter control section executes zero-torque control in which the inverter is controlled such that torque regenerated by the rotary electric machine becomes zero, and executes high-loss control in which the field current is varied so as to increase the armature current while maintaining a torque command provided in the zero-torque control.

8 Claims, 8 Drawing Sheets

(51) Int. Cl.
*H02P 3/18* (2006.01)
*B60L 3/00* (2006.01)

(56) References Cited

U.S. PATENT DOCUMENTS

| | | | |
|---|---|---|---|
| 2008/0190680 A1* | 8/2008 | Kaneko et al. | 180/170 |
| 2008/0306643 A1* | 12/2008 | Hanyu et al. | 701/22 |
| 2009/0243523 A1* | 10/2009 | Tanaka et al. | 318/376 |
| 2009/0284195 A1* | 11/2009 | Gallegos-Lopez et al. | 318/400.02 |
| 2010/0123418 A1* | 5/2010 | Itoh et al. | 318/400.02 |
| 2010/0127648 A1* | 5/2010 | Akiyama | 318/400.11 |
| 2011/0031907 A1* | 2/2011 | Takahashi | 318/139 |
| 2011/0051371 A1* | 3/2011 | Azuma et al. | 361/699 |

FOREIGN PATENT DOCUMENTS

| | | |
|---|---|---|
| JP | A-2009-219189 | 9/2009 |
| JP | A-2009-232652 | 10/2009 |
| JP | A-2010-041838 | 2/2010 |

* cited by examiner

351: Id_0Nm_loss = Id_loss

352: Id* < 0 ?
- NO → #357
- YES → #353

353: Id_0Nm_loss = (|Id_0Nm_loss| − |ΔId|)

354: Id_0Nm_loss < 0 ?
- YES → #355
- NO → #356

355: Id* = Id_0Nm_loss; Iq* = 0

356: Id* = 0; Iq* = 0

357: NORMAL DISCHARGE CONTROL PROCESS

RETURN

ROTARY ELECTRICAL MACHINE CONTROL DEVICE

INCORPORATION BY REFERENCE

The disclosure of Japanese Patent Application No. 2011-143292 filed on Jun. 28, 2011 including the specification, drawings and abstract is incorporated herein by reference in its entirety.

BACKGROUND OF THE INVENTION

The present invention relates to a rotary electric machine control device that controls a rotary electric machine drive device including an inverter interposed between a DC power source section including a power storage device and an AC rotary electric machine to perform power conversion between DC power from the DC power source section and AC power for the rotary electric machine.

DESCRIPTION OF THE RELATED ART

In order to reduce a load on the environment due to consumption of fossil fuel, there have been proposed electric vehicles driven by an AC rotary electric machine and hybrid vehicles driven by an AC rotary electric machine and an internal combustion engine. In the electric vehicles and the hybrid vehicles, the rotary electric machine and a battery that supplies electric power to the rotary electric machine are connected to each other. The rotary electric machine not only functions as an electric motor that serves as a drive source for the vehicle, but also functions as an electric generator that generates electric power using kinetic energy of the vehicle, the internal combustion engine, etc. Electric power generated by the rotary electric machine is regenerated and stored in the battery. Because the battery is a DC power source, an inverter that performs power conversion between DC power and AC power is generally provided between the battery and the rotary electric machine.

An opening/closing device (contactor) is occasionally provided between the battery and the rotary electric machine, more specifically between the battery and the inverter. When the contactor is closed, the battery and the inverter (and the rotary electric machine) are electrically connected to each other. When the contactor is opened, electrical connection between the battery and the inverter (and the rotary electric machine) is blocked. For example, in the case where a main switch of the vehicle is turned off, in the case where it is necessary to secure the safety of the vehicle, and so forth, the contactor is opened. In such cases, regenerated electric power fed from the rotary electric machine to the battery via the inverter is blocked by the contactor. Therefore, electric power is stored in a smoothing condenser provided between the contactor and the inverter, for example, which raises a DC voltage to be applied to the inverter. Japanese Patent Application Publication No. 2009-232652 (JP 2009-232652 A) describes a rotary electric machine control device that suppresses a rise in voltage of a smoothing condenser by reducing regenerated power by controlling an inverter such that torque of a rotary electric machine becomes zero when connection between a battery and the rotary electric machine is released.

In recent years, on the other hand, it has been requested to reduce the capacitance of the smoothing condenser in order to achieve space saving and cost reduction of the rotary electric machine control device. If the capacitance of the smoothing condenser is reduced, the voltage rises quickly when the contactor is opened. Thus, it is desired to further suppress regenerated power compared to JP 2009-232652 A.

SUMMARY OF THE INVENTION

In view of the foregoing background, it is desired to immediately reduce regenerated power fed from a rotary electric machine via an inverter in the case where connection between a rotary electric machine drive device including the inverter and a DC power source section is blocked.

In view of the foregoing issue, according to a first aspect of the present invention, a rotary electric machine control device, which controls a rotary electric machine drive device including an inverter interposed between a DC power source section including a power storage device and an AC rotary electric machine to perform power conversion between DC power from the DC power source section and AC power for the rotary electric machine, includes: an inverter control section that controls the inverter by controlling an armature current in a two-axis orthogonal coordinate system that rotates in synchronization with rotation of the rotary electric machine, the armature current being a vector obtained by synthesizing a field current and a drive current extending along respective axes of the orthogonal coordinate system, in which the inverter control section determines whether connection between the DC power source section and the inverter is in a blocked state, and if it is determined that the connection is in the blocked state, the inverter control section executes zero-torque control in which the inverter is controlled such that torque regenerated by the rotary electric machine becomes zero, and executes high-loss control in which the field current is varied so as to increase the armature current while maintaining a torque command provided in the zero-torque control.

It is possible to suppress regenerated power by executing the zero-torque control in which the inverter is controlled such that torque regenerated by the rotary electric machine becomes zero. In addition, it is possible to further suppress regenerated power by executing the high-loss control in which the field current is varied so as to increase the armature current while maintaining a torque command provided in the zero-torque control, thereby consuming an extra amount of regenerated power. As a result, it is possible to immediately reduce regenerated power fed from the rotary electric machine via the inverter in the case where connection between the rotary electric machine drive device including the inverter and the DC power source section is blocked.

In the case where the torque command is varied, in general, a restriction is imposed on the torque variation rate in order to secure the following performance of the control or suppress vibration due to abrupt variations. In the case where connection between the DC power source section and the inverter is in the blocked state, however, regenerated torque may be quickly reduced to quickly reduce regenerated power. Therefore, a high torque variation rate, which falls within such a range that the torque variation rate can be followed by the control, may be allowed. In a second aspect of the present invention, in executing the zero-torque control in the blocked state, the inverter control section of the rotary electric machine control device according to the first aspect of the present invention may set a restriction value for a torque variation rate at which the torque regenerated by the rotary electric machine is reduced to zero to be larger than a restriction value for the torque variation rate with the connection between the DC power source section and the inverter maintained.

As discussed above, in the case where the torque command is varied, a restriction is often imposed on the torque variation rate in order to secure the following performance of the control or suppress vibration due to abrupt variations. While the torque variation rate may take different values in accordance with the rotational speed of the rotary electric machine, a constant value is often used in normal control. In the case where connection between the DC power source section and the inverter is in the blocked state, however, regenerated power may be quickly reduced. Thus, the inverter may be controlled such that torque regenerated by the rotary electric machine becomes zero at a high torque variation rate that falls within such a range that the torque variation rate can be followed by the control. In a third aspect of the present invention, in executing the zero-torque control in the blocked state, the inverter control section of the rotary electric machine control device according to the first aspect of the present invention variably may set the torque variation rate at which the torque regenerated by the rotary electric machine is reduced to zero in accordance with a rotational speed of the rotary electric machine.

Even in the case where the zero-torque control is executed and the high-loss control is executed, the magnitude of regenerated power can reach the allowable amount for the rotary electric machine drive device. The allowable amount can be determined by the DC voltage (voltage between the positive and negative terminals) of the inverter, for example. The safety of the rotary electric machine drive device may be secured in accordance with the determination results. In a fourth aspect of the present invention, in the rotary electric machine control device according to the first aspect of the present invention, the inverter may include a plurality of switching elements and free-wheel diodes connected in parallel with respective ones of the switching elements; and in the case where a voltage between terminals of a smoothing condenser becomes equal to or more than a predetermined overvoltage threshold with the smoothing condenser kept connected between positive and negative DC terminals of the inverter even after the blocked state is established, the inverter control section may execute shut-down control in which all the switching elements forming the inverter are turned off.

BRIEF DESCRIPTION OF THE DRAWINGS

FIG. 6 is a flowchart showing the flow of a convergence process;

DETAILED DESCRIPTION OF THE EMBODIMENTS

An embodiment of the present invention will be described with reference to the drawings using a case where the present invention is applied to a rotary electric machine control device that controls a drive device (rotary electric machine drive device) for a hybrid vehicle of a so-called 2-motor split type as an example. The hybrid vehicle includes an internal combustion engine (not shown) and a pair of motors (rotary electric machines) MG1 and MG2 each serving as a drive power source. The drive device for the hybrid vehicle includes a differential gear device (not shown) for power distribution that distributes output of the internal combustion engine to the side of the first motor MG1 and the side of wheels and the second motor MG2. In the embodiment, a drive device 1 (rotary electric machine drive device) is formed as a device that drives the two motors MG1 and MG2. Here, each of the first motor MG1 and the second motor MG2 is an AC motor that operates on multi-phase AC (here, 3-phase AC), and an interior permanent magnet synchronous motor (IPMSM). The motors MG1 and MG2 operate both as a motor and as an electric generator (generator) as necessary. Hereinafter, the motors MG1 and MG2 are simply referred to as "motor MG" except for a case where it is particularly necessary to distinguish the two motors from each other.

Figure 1:
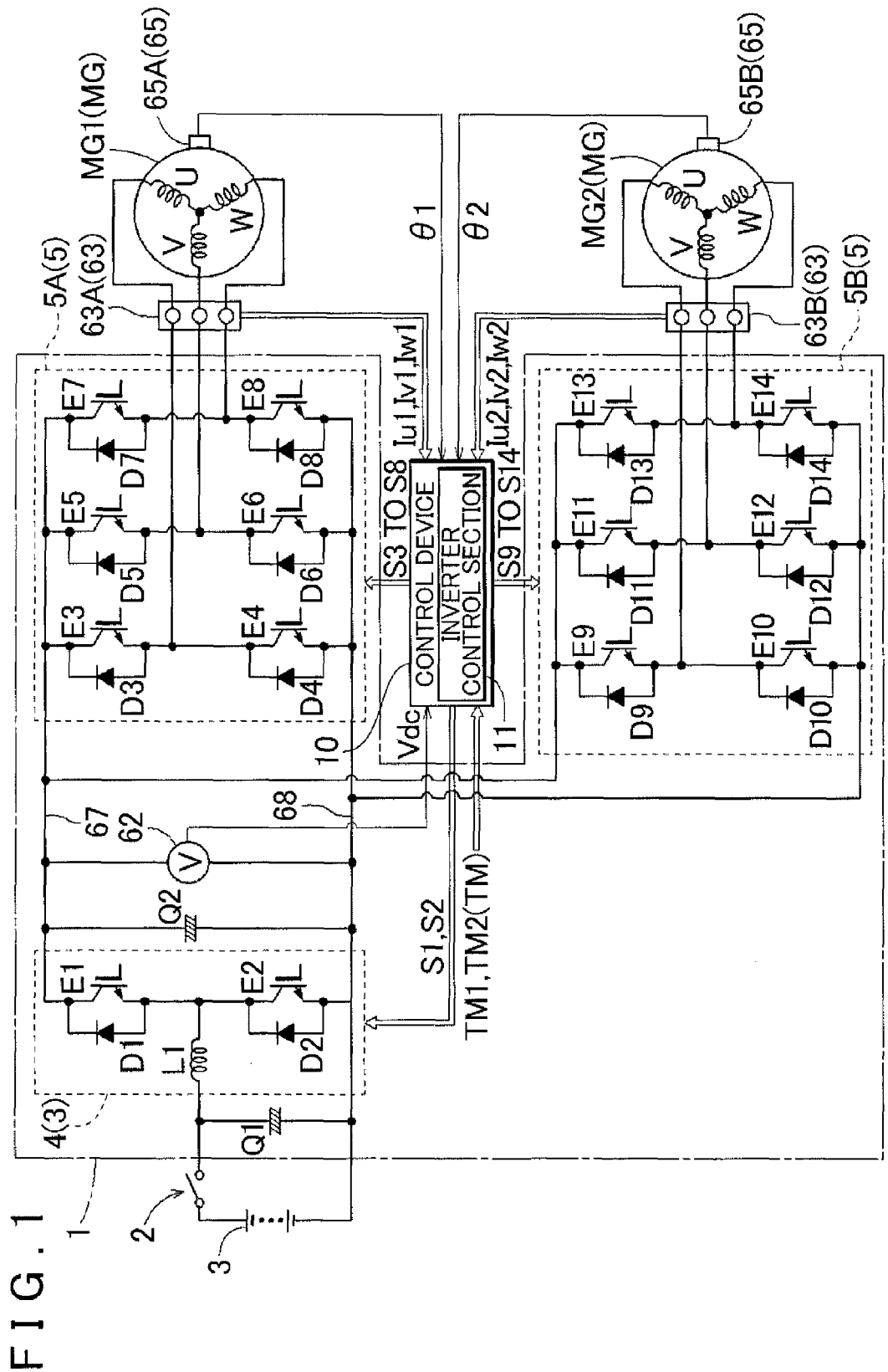
FIG. 1 is a block diagram schematically showing a configuration example of a rotary electric machine drive device.

As shown in FIG. 1, the first motor MG1 and the second motor MG2 are electrically connected to a battery 3 (DC power source section) via the drive device 1. The drive device 1 and the battery 3 are electrically connected to each other via a contactor 2 (opening/closing device). When the contactor 2 is closed, the drive device 1 and the battery 3 are electrically connected to each other. When the contactor is opened, electrical connection between the battery 3 and the drive device 1 is blocked. For example, in the case where a main switch of the vehicle is turned off, in the case where it is necessary to secure the safety of the vehicle, and so forth, the contactor 2 is opened.

The drive device 1 includes two inverters, namely a first inverter 5A corresponding to the first motor MG1 and a second inverter 5B corresponding to the second motor MG2. Hereinafter, the two inverters 5A and 5B are referred to as "inverter 5" except for a case where it is particularly necessary to distinguish the two inverters from each other. In the embodiment, the drive device 1 includes one converter 4 that is common to the two inverters 5 (5A and 5B). The converter 4 is a voltage conversion device that converts DC power (voltage) between a system voltage Vdc that is common to the two inverters 5 (5A and 5B) and the voltage of the battery 3. The drive device 1 includes a first smoothing condenser Q1 that smoothes the voltage between the positive and negative electrodes of the battery 3, and a second smoothing condenser Q2 that smoothes the system voltage Vdc as the DC voltage of the inverter 5.

The voltage between the terminals of the second smoothing condenser Q2, that is, the DC voltage of the inverter 5 (system voltage Vdc), is detected by a voltage sensor 62 and provided to an inverter control section 11 of a control device 10 (rotary electric machine control device). The battery 3 is configured to supply electric power to the motors MG1 and MG2 via the converter 4 and the two inverters 5A and 5B, and to store electric power generated by the motors MG1 and MG2. That is, the battery 3 according to the embodiment corresponds to the "DC power source section including a power storage device" according to the present invention. Examples of the battery 3 include various types of secondary batteries such as nickel-hydrogen secondary batteries and lithium-ion secondary batteries, capacitors, and a combination thereof. The battery 3 and the converter 4 may be combined with each other so as to correspond to the "DC power source section including a power storage device" according to the present invention. In this case, electrical connection between the battery 3 and the converter 4 and the inverters 5 can be substantially blocked by turning off switching elements forming the converter 4. Thus, not only the contactor 2 but also the converter 4 functions as a contactor (opening/closing device).

The converter 4 is formed as a DC/DC converter that converts the DC voltage of the battery 3 to generate the desired system voltage Vdc. When the motors MG1 and MG2 function as an electric generator, the converter 4 reduces the system voltage Vdc and supplies the resulting voltage to the battery 3 to charge the battery 3. The converter 4 includes a reactor L1, switching elements E1 and E2, and free-wheel diodes D1 and D2 connected in parallel (inverse parallel) with the switching elements E1 and E2, respectively, such that the conducting directions of their respective rectifiers are opposite to each other. Here, the converter 4 includes a pair of an upper arm element E1 and a lower arm element E2 connected in series with each other as the switching elements. In the example, insulated gate bipolar transistors (IGBTs) are used as the switching elements E1 and E2. Besides IGBTs, power transistors of various structures such as a bipolar type, a field-effect type, and a MOS type may also be used. This also applies to switching elements E3 to E14 of the inverter 5 to be described below.

The switching elements E1 and E2 operate in accordance with control signals S1 and S2, respectively, output from the control device 10. In the embodiment, the control signals S1 and S2 are a switching control signal for controlling switching of the switching elements E1 and E2, respectively, more specifically a gate drive signal for driving the gate of the switching elements E1 and E2, respectively. This allows the converter 4 to raise the voltage output from the battery 3 to the desired system voltage Vdc to supply the resulting voltage to the inverters 5. In the case where the converter 4 does not raise the voltage, the system voltage Vdc is equal to the voltage of the battery 3.

The first inverter 5A performs power conversion between DC power at the system voltage Vdc and AC power for the first motor MG1. The second inverter 5B performs power conversion between DC power at the system voltage Vdc and AC power for the second motor MG2. The first inverter 5A and the second inverter 5B are formed from a bridge circuit, and include a plurality of sets of switching elements E3 to E8 and E9 to E14, respectively.

The first inverter 5A and the second inverter 5B include a pair of switching elements for each of legs for respective phases (three phases, namely U phase, V phase, and W phase) of the first motor MG1 and the second motor MG2. Specifically, the U phase includes a leg formed from an upper arm element E3 and a lower arm element E4, and a leg formed from an upper arm element E9 and a lower arm element E10. The V phase includes a leg formed from an upper arm element E5 and a lower arm element E6, and a leg formed from an upper arm element E11 and a lower arm element E12. The W phase includes a leg formed from an upper arm element E7 and a lower arm element E8, and a leg formed from an upper arm element E13 and a lower arm element E14. In the embodiment, IGBTs are used as the switching elements E3 to E14. Free-wheel diodes D3 to D14 are connected in inverse parallel with the switching elements E3 to E14, respectively.

The switching elements E3 to E14 operate in accordance with switching control signals S3 to S14, respectively, output from the inverter control section 11 of the control device 10. In the embodiment, the switching control signals S3 to S14 are a gate drive signal for driving the gate of the switching elements E3 to E14, respectively. The inverter 5 converts DC power at the system voltage Vdc into AC power to supply the resulting AC power to the motor MG, and causes the motor MG to output torque matching target torque TM (TM1 and TM2) provided from an upper-level control device such as a travel control electronic control unit (ECU) (not shown). In this event, the switching elements E3 to E14 perform switching operation in accordance with the switching control signals S3 to S14, respectively, in a control mode such as a pulse width modulation control mode (hereinafter occasionally referred to as "PWM control mode") and a rectangular-wave control mode to be discussed later. When the motor MG functions as an electric generator, the inverter 5 converts generated AC power into DC power to feed the resulting DC power to the battery 3 via the converter 4.

Actual currents Iu1, Iv1, Iw1, Iu2, Iv2, and Iw2 that flow between the inverters 5 and the coils for the respective phases of the motors MG are detected by current sensors 63 (63A and 63B), and output to the control device 10. In the example, the currents for all the three phases are detected. Because the three phases are balanced and the sum of the instantaneous values of the currents for the three phases is zero, however, the currents for only two phases may be detected by sensors, and the current for the remaining phase may be computed by the control device 10. Magnetic pole positions $\theta$ ($\theta 1$ and $\theta 2$) of the rotors of the motors MG at each time point are detected by rotation sensors 65 (65A and 65B), and output to the control device 10. The rotation sensors 65 are formed from a resolver or the like, for example. The magnetic pole positions $\theta 1$ and $\theta 2$ represent the rotational angle of the rotor in terms of electrical angle.

Functional sections of the control device 10 which controls the drive device 1 are implemented by hardware, software (a program), or a combination of both that performs various processes on input data with a logic circuit such as a microcomputer serving as a core member. In the embodiment, the control device 10 includes the inverter control section 11 which controls the motors MG1 and MG2 via the inverters 5A and 5B through current feedback control using a vector control method. As other functional sections, the control device 10 also includes a converter control section (not shown) that controls the converter 4 so as to generate the desired system voltage Vdc through DC voltage conversion control, for example.

The inverter control section 11 has at least two control modes, namely pulse width modulation (PWM) control and rectangular-wave control (one-pulse control), as the modes of switching patterns (modes of voltage waveform control) for the switching elements E3 to E14 forming the inverter 5. In addition, the inverter control section 11 has, as the modes of field control for the stator, normal field control such as maximum torque control in which maximum torque is output for a motor current and maximum efficiency control in which the motor is driven at the maximum efficiency for a motor current, and field regulation control such as field weakening control in which a field current that does not contribute to torque is applied to weaken field magnetic flux and field intensifying control for intensifying field magnetic flux.

In the embodiment, the motor MG is controlled by executing current feedback control using a current vector control method in a two-axis orthogonal coordinate system (orthogonal vector space) that rotates in synchronization with rotation of the motor MG. In the current vector control method, for example, the current feedback control is performed in the two-axis orthogonal coordinate system (orthogonal vector space) defined by a d-axis extending along the direction of field magnetic flux generated by a permanent magnet and a q-axis that is electrically advanced by π/2 with respect to the d-axis. The inverter control section 11 decides a torque command T* on the basis of the target torque TM for the motor MG to be controlled, and decides d-axis and q-axis current commands Id* and Iq*. The inverter control section 11 calculates deviations between the current commands Id* and Iq* and the actual currents Iu1, Iv1, Iw1, Iu2, Iv2, and Iw2 which flow between the inverters 5 and the coils for the respective phases of the motors MG to perform proportional-integral control computation (PI control computation) or proportional-integral-differential control computation (PID control computation) to finally decide voltage commands for the three phases. The switching control signals S3 to S14 are generated on the basis of the voltage commands. Mutual coordinate conversion between the actual three-phase space for the motor MG (three-axis coordinate system on a two-dimensional plane) and the two-axis orthogonal vector space (two-axis orthogonal coordinate system) are performed on the basis of the magnetic pole position θ detected by the rotation sensor 65. The rotational speed ω (angular speed) and the number of revolutions N [rpm] of the motor MG are derived from the detection results of the rotation sensor 65 (65A and 65B).

In the embodiment, as discussed above, the switching modes of the inverter 5 include the PWM control mode and the rectangular-wave control mode. In the PWM control, the duty of each pulse is set such that a PWM waveform, which is the output voltage waveform of the inverter 5 for each of the U, V, and W phases, is formed by a collection of pulses forming a high-level period for which the upper arm elements are turned on and a low-level period for which the lower arm elements are turned on, and such that the fundamental-wave component of the PWM waveform in a certain period forms a generally sinusoidal wave. The PWM control includes sinusoidal PWM (SPWM), space vector PWM (SVPWM), overmodulation PWM control, and so forth known in the art. In the embodiment, in the PWM control, drive of the inverter 5 is controlled by controlling an armature current which is a vector obtained by synthesizing the field current (d-axis current) and the drive current (q-axis current) extending along the axes of the orthogonal coordinate system. That is, the inverter control section 11 controls drive of the inverter 5 by controlling the current phase angle of the armature current (angle formed between the q-axis current vector and the armature current vector) in a d-q-axis vector space (d-q-axis orthogonal coordinate system). Thus, the PWM control is also referred to as "current phase control".

In the rectangular-wave control (one-pulse control), in contrast, the inverter 5 is controlled by controlling the voltage phase of 3-phase AC power. The voltage phase of 3-phase AC power corresponds to the phases of voltage command values for the three phases. In the embodiment, the rectangular-wave control is rotation synchronization control in which each of the switching elements of the inverter 5 is turned on and off once each per one cycle of the motor MG in terms of electrical angle and in which one pulse is output for each phase per one cycle in terms of electrical angle. In the embodiment, in the rectangular-wave control, the inverter 5 is driven by controlling the voltage phase of 3-phase AC power. Thus, the rectangular-wave control is referred to as "voltage phase control".

In the embodiment, as discussed above, the modes of field control include the normal field control and the field regulation control. The normal field control such as the maximum torque control and the maximum efficiency control is a control mode that uses fundamental current command values (d-axis current command and q-axis current command) set on the basis of the target torque TM for the motor MG. In contrast, the field weakening control is a control mode in which the d-axis current command, among the fundamental current command values, is regulated to weaken field magnetic flux from the stator. Meanwhile, the field intensifying control is a control mode in which the d-axis current command, among the fundamental current command values, is regulated to intensify field magnetic flux from the stator. In the event of the field weakening control, the field intensifying control, or the like, the d-axis current is thus regulated. Here, the regulated value is referred to as "field regulation current".

As discussed above, drive of the motor MG is controlled through the current phase control or the voltage phase control in accordance with the target torque. In the case where the main switch of the vehicle is turned off during drive of the motor MG, or in the case where it is necessary to secure the safety of the vehicle, the contactor 2 is opened to block connection between the battery 3 (DC power source section) and the inverter 5. In this event, the converter 4 is shut down, and both the upper arm element E1 and the lower arm element E2 are turned off. Here, as the motor MG continues rotating, electric power generated by the motor MG is not fed to the battery 3, but charged in the second smoothing condenser Q2 which smoothes the DC voltage of the inverter 5 (system voltage Vdc). Such charging raises the voltage between the terminals of the second smoothing condenser Q2, that is, the system voltage Vdc. A regenerated power suppression process to be discussed in detail below is executed such that the system voltage Vdc does not exceed the withstanding voltage of the inverter 5, that is, the withstanding voltage of the switching elements E3 to E14.

In the embodiment, a case where the contactor 2 is opened with at least one of the first motor MG1 and the second motor MG2 performing regeneration and where regenerated power exceeds power for power running and is fed toward the battery 3 via the inverter 5, for example, will be described. Here, a case where the motor MG performing regeneration is controlled in the PWM control mode, for example, will be described.

Figure 2:
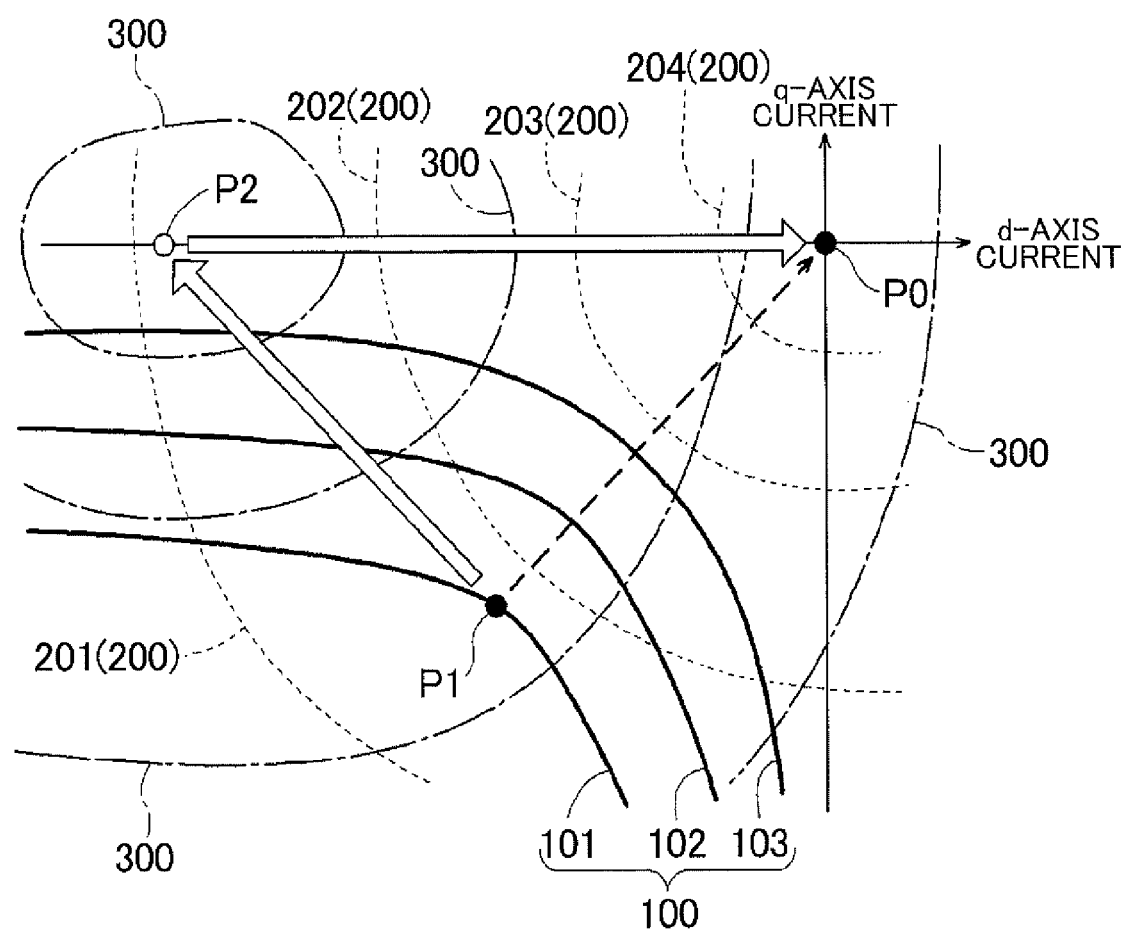
FIG. 2 is an illustration schematically showing the principle of zero-torque control and a regenerated power suppression process in a current vector space (an orthogonal coordinate system representing current vectors)

FIG. 2 shows a current vector space (an orthogonal coordinate system representing current vectors). In FIG. 2, curves 100 (101 to 103) are each an equal torque curve indicating a vector locus for the armature current on which the motor MG outputs certain torque. The equal torque curve 102 corresponds to torque lower than that for the equal torque curve 101, and the equal torque curve 103 corresponds to torque lower than that for the equal torque curve 102. Curves 200 (201 to 204) are each a constant-current circle. Curves 300 are each a voltage/speed ellipse (voltage restriction ellipse). The constant-current circle is a vector locus on which the armature current has a constant value. The voltage/speed ellipse is a vector locus indicating the range of a current command that can be set in accordance with the values of the rotational speed of the motor MG and the DC voltage of the inverter 5 (system voltage Vdc). The size of the voltage/speed ellipse 300 is determined on the basis of the system voltage Vdc and the rotational speed ω (or the number of revolutions N) of the motor MG. Specifically, the diameter of the voltage/speed ellipse 300 is proportional to the system voltage Vdc, and inversely proportional to the rotational speed co of the motor MG. The current commands Id* and Iq* are set as values at an operating point provided on the equal torque curve 100 and within the constant-current circle 200 in such a current vector space (an orthogonal coordinate system representing current vectors). A current command map to be discussed later is a map prescribed on the basis of such a current vector space (an orthogonal coordinate system representing current vectors).

Here, it is assumed that the motor MG is performing regeneration at an operating point P1 on the equal torque curve 101, the contactor 2 which has been closed is opened, and the converter 4 is shut down. If it is predicted that the voltage between the terminals of the second smoothing condenser Q2 rises, the inverter control section 11 executes the regenerated power suppression process. To perform the regenerated power suppression process, the inverter control section 11 first executes zero-torque control in which the target torque TM is set to zero and the inverter 5 is controlled such that torque regenerated by the motor MG becomes zero. As shown in FIG. 2, the operating point at which regenerated torque is zero corresponds to the center of the constant-current circle 200 (operating point P0). Thus, as indicated by the broken arrow in FIG. 2, the absolute values (current amounts) of the d-axis current and the q-axis current are reduced from the operating point P1 to the operating point P0.

It should be noted, however, that in suppressing regenerated power fed to the second smoothing condenser Q2, the current amount for the d-axis current which does not contribute to torque is preferably not reduced but kept at a high level to increase a loss. Thus, high-loss control in which the d-axis current is utilized is further executed in the regenerated power suppression process. Specifically, the d-axis current is increased while reducing the q-axis current to bring torque closer to zero as in the transition from the current operating point P1 to the operating point P0 serving as the target for the zero-torque control. That is, as indicated by a block arrow in FIG. 2, a transition is made from the current operating point P1 to an operating point P2 at which the q-axis current is zero and the absolute value of the d-axis current is larger than that at the operating point P1. Here, the operating point P2 corresponds to the center of the voltage/speed ellipse 300. After the operating point P2 is reached, as indicated by a block arrow in FIG. 2, the absolute value of the d-axis current is reduced while maintaining the q-axis current which contributes to torque at zero to complete a transition to the operating point P0 serving as the target for the zero-torque control.

Figure 3:
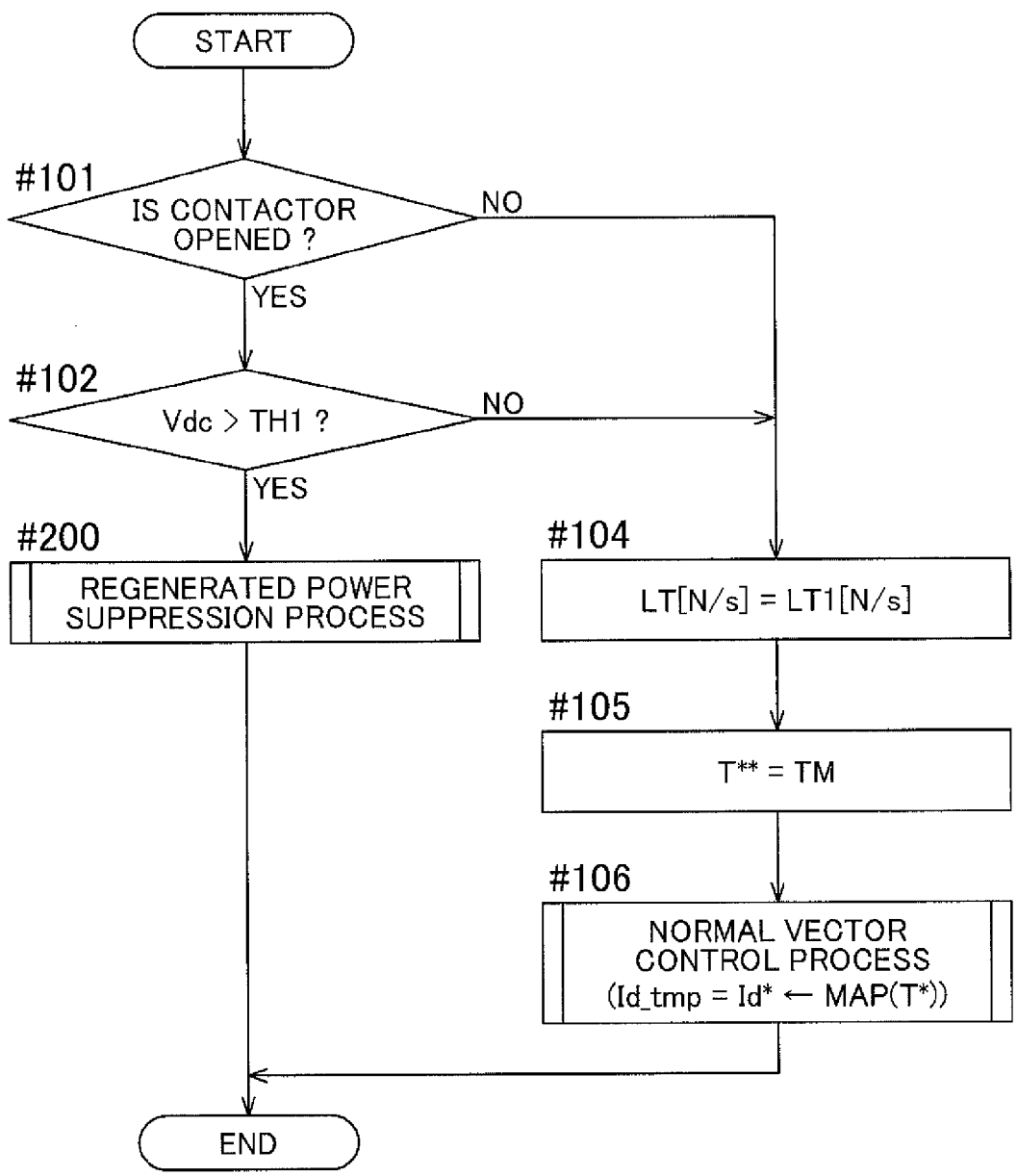
FIG. 3 is a flowchart showing the flow of the overall control process including the regenerated power suppression process.
Figure 4:
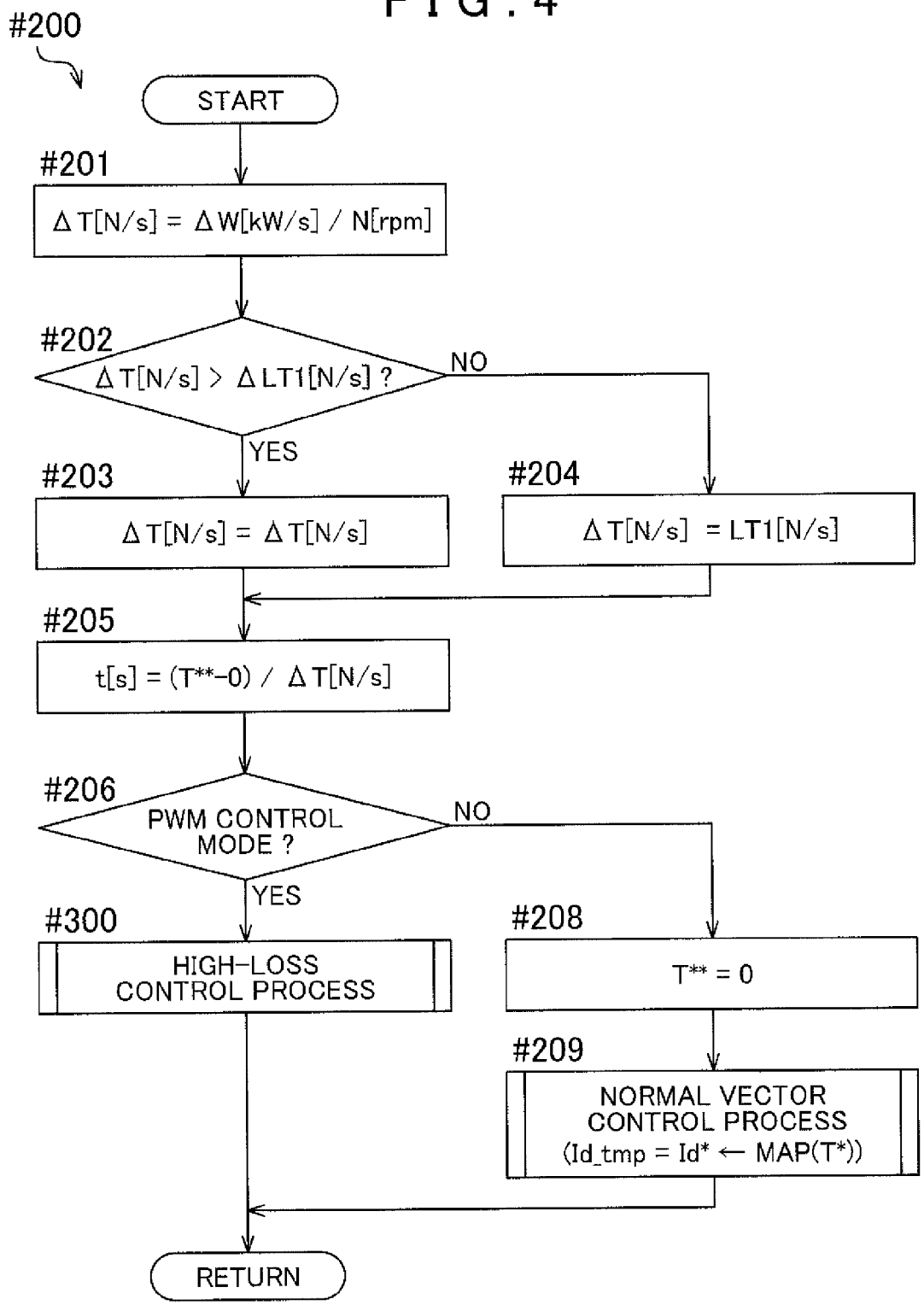
FIG. 4 is a flowchart showing the flow of the regenerated power suppression process.
Figure 5:
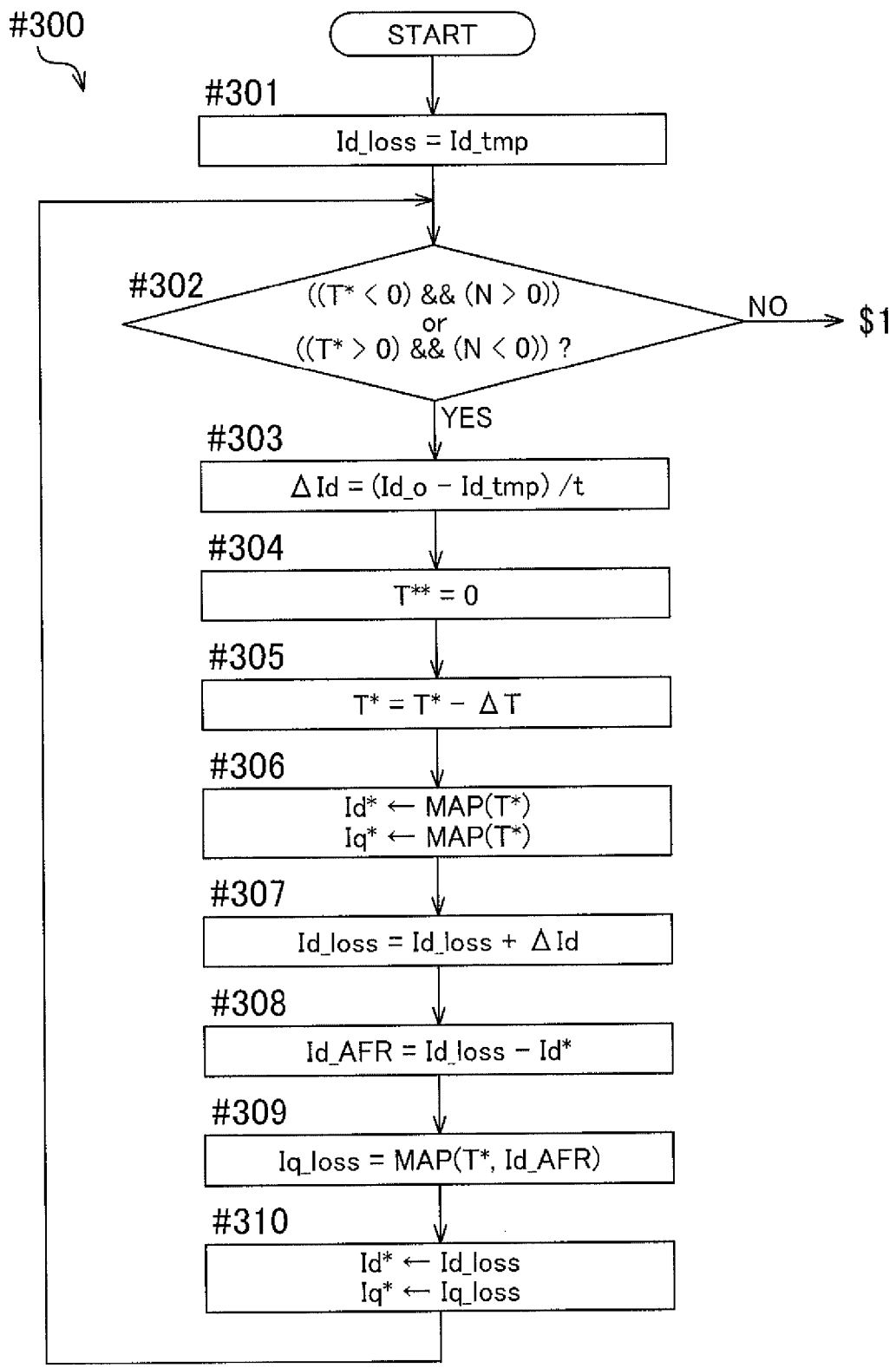
FIG. 5 is a flowchart showing the flow of a high-loss control process.

The regenerated power suppression process will be discussed in detail below with reference to the flowcharts of FIGS. 3 to 6. FIG. 3 is a flowchart showing the flow of the overall process including the regenerated power suppression process. First, it is determined whether the contactor 2 is opened or closed on the basis of a detection signal from a sensor or a switch (not shown) that indicates whether the contactor 2 is opened or closed (#101). If it is determined that the contactor 2 is opened (contactor opened), the inverter control section 11 next determines whether or not the voltage between the terminals of the second smoothing condenser Q2, that is, the system voltage Vdc, is more than a determination threshold TH1 for determining whether or not the regenerated power suppression process is required (#102). If the system voltage Vdc is more than the determination threshold TH1, a regenerated power suppression process #200 which is discussed in detail below with reference to FIGS. 4 to 6 is executed.

If it is determined in step #101 that the contactor 2 is closed, or if it is determined in step #102 that the system voltage Vdc is not more than the determination threshold TH1, a normal vector control process is executed (#106). That is, the current phase control or the voltage phase control discussed above is executed. For the normal vector control, a restriction value LT [N/s] for the rate of variation in torque command T* per unit time, which is set for control in accordance with the target torque TM, is set to a normal torque variation rate restriction value LT1 [N/s] (#104). In addition, final target torque T**, which is set in accordance with the target torque TM, is set to the target torque TM (#105). In the case where the normal vector control process is executed through the current phase control (PWM control mode), the d-axis current command Id* is acquired from a current command map generated in advance on the basis of the torque characteristics. That is, the d-axis current command Id* is acquired from the current command map in accordance with the torque command T* set within the range of the restriction value LT for the torque variation rate from the current torque toward the final target torque T**. The d-axis current command Id* in the normal vector control process is utilized as a variable Id_tmp in the regenerated power suppression process #200 to be discussed in detail later.

In the regenerated power suppression process #200, the zero-torque control in which torque regenerated by the motor MG is brought to zero [Nm] is executed. In executing the regenerated power suppression process #200, as shown in FIG. 4, a torque variation rate $\Delta T$ [N/s] is first computed (#201). The torque variation rate $\Delta T$ is computed on the basis of a power variation rate $\Delta W$ [kW/s], which is the maximum value of the rate of variation in regenerated power in the range in which the motor MG is controllable, and the current number of revolutions N [rpm] (rotational speed $\omega$) of the motor MG.

Next, it is determined whether or not the torque variation rate AT is more than the normal torque variation rate restriction value LT1 for the torque variation rate (#202). If the torque variation rate $\Delta T$ is more than the normal torque variation rate restriction value LT1, the torque variation rate $\Delta T$ computed as described above is adopted as the torque variation rate $\Delta T$ (#203). If the torque variation rate $\Delta T$ is not more than the normal torque variation rate restriction value LT1, on the other hand, the normal torque variation rate restriction value LT1 is set as the torque variation rate $\Delta T$ (#204). That is, in the regenerated power suppression process, torque is preferably reduced as quickly as possible to achieve the zero-torque control, and thus a torque variation rate $\Delta T$ that is as high as possible is used. The maximum value of the torque variation rate $\Delta T$ computed on the basis of the power variation rate $\Delta W$ and the number of revolutions N is substantially restricted by the power variation rate $\Delta W$. In the embodiment, the restriction value is approximately five to six times the normal torque variation rate restriction value LT1.

In the case where the torque command T* is varied, in general, a restriction is imposed on the torque variation rate $\Delta T$ in order to secure the following performance of the control or suppress vibration due to abrupt variations. In the case where connection between the battery 3 and the inverter 5 is in the blocked state, however, regenerated torque is preferably quickly reduced to quickly reduce regenerated power. Therefore, it is preferable to allow a high torque variation rate $\Delta T$ that falls within such a range that the torque variation rate $\Delta T$ can be followed by the control. As discussed above, in executing the zero-torque control, the restriction value LT for the torque variation rate is preferably set to a value that is larger than the normal torque variation rate restriction value LT1, which is the restriction value for the torque variation rate with connection between the battery 3 and the inverter 5 maintained. As discussed above in relation to step #201 in FIG. 4, the torque variation rate $\Delta T$ is computed on the basis of a power variation rate $\Delta W$ [kW/s], which is the maximum value of the rate of variation in regenerated power in the range in which the motor MG is controllable, and the current number of revolutions N [rpm] (rotational speed $\omega$) of the motor MG.

Thus, the torque variation rate ΔT based on the predetermined number of revolutions N and power variation rate ΔW in practical ranges is used as the restriction value LT for the torque variation rate. In practice, the power variation rate ΔW prescribes the restriction value LT for the torque variation rate.

While the torque variation rate ΔT may take different values in accordance with the rotational speed of the motor MG, a constant value is often used in normal control. In the case where connection between the battery 3 and the inverter 5 is in the blocked state, however, regenerated power is preferably quickly reduced. Thus, the inverter 5 is preferably controlled such that torque regenerated by the motor MG becomes zero at a high torque variation rate ΔT that falls within such a range that the torque variation rate ΔT can be followed by the control. As discussed above, the torque variation rate ΔT at which torque regenerated by the motor MG is reduced to zero is preferably variably set in accordance with the number of revolutions N (rotational speed ω) of the motor MG. As discussed above in relation to step #201 in FIG. 4, the torque variation rate ΔT is computed on the basis of a power variation rate ΔW [kW/s], which is the maximum value of the rate of variation in regenerated power in the range in which the motor MG is controllable, and the current number of revolutions N [rpm] (rotational speed ω) of the motor MG. That is, the torque variation rate ΔT is set to be inversely proportional to the number of revolutions N (rotational speed (ω)) so as to become higher as the number of revolutions N becomes smaller.

Subsequently, a transition time t [s] that is required to vary torque at the torque variation rate ΔT from the current final target torque T to zero is computed (#205). The transition time t is substantially used in a high-loss control process #300 to be discussed later. Thus, the transition time t may be computed in the high-loss control process #300. Next, it is determined whether or not the current control mode is the PWM control mode (step #206). If the motor MG is controlled not in the PWM control mode but in the rectangular-wave control mode, for example, the process does not proceed to the high-loss control process #300, and the final target torque T is set to zero, and the rectangular-wave control is executed (#208 and #209). This is because the rectangular-wave control mode corresponds to voltage phase control, and high-loss control in which the absolute value of the d-axis current is increased by controlling the current phase may not be performed. If the current control mode is the PWM control mode, the high-loss control process #300 is executed.

At the start of the high-loss control process #300, as shown in FIG. 5, a high-loss d-axis current command Id_loss is set as a variable, and Id_tmp (current d-axis current command Id*) discussed above in relation to step #106 in FIG. 3 is substituted for the variable (#301). Next, it is determined from the relationship between the torque command T* and the number of revolutions N whether or not the motor MG is performing regeneration, that is, whether or not the zero-torque control has been unachieved yet (#302). If the zero-torque control has not been unachieved, the process proceeds to a convergence process (#351 to #356 in FIG. 6) to be discussed later ($1).

If it is determined in step #302 that the zero-torque control has been unachieved yet, an amount of variation ΔId in d-axis current command Id* per unit time is computed (#303). In the regenerated power suppression process, as discussed above, the zero-torque control is executed. Therefore, the difference between the value Id_o of the d-axis current at the center of the voltage/speed ellipse 300 (operating point P2) and the value Id_loss of the current d-axis current command is divided by the transition time t [s] discussed above to compute the amount of variation ΔId in d-axis current per unit time. That is, the amount of variation ΔId in d-axis current per unit time can be varied in accordance with the transition time t [s] required to vary torque to zero at the torque variation rate ΔT is calculated. In the case where the operating point P2 is set such that the difference between the value of the d-axis current at the operating point P1 and the value of the d-axis current at the operating point P0 is the same as the difference between the value of the d-axis current at the operating point P1 and the value of the d-axis current at the operating point P2, the value at the center of the constant-current circle 200 (operating point P0) may be used as Id_o if given an appropriate sign.

Subsequently, the final target torque T** is set to zero (#304). The inverter control section 11 updates the torque command T* by subtracting the torque variation rate ΔT from the current torque command T* in such a direction that the torque command T* becomes closer to the final target torque T** (=0) (#305). The inverter control section 11 references the current command map on the basis of the updated torque command T* to acquire the values of the d-axis current command Id* and the q-axis current command Iq* (#306). The d-axis current command Id* is a current command for the maximum torque control or the maximum efficiency control, and thus involves a low loss. Thus, in order to achieve the high-loss control in which the loss is increased to consume regenerated power, the d-axis current command Id* is regulated in accordance with the field regulation current as in the field weakening control or the field intensifying control.

In the field regulation, the inverter control section 11 first updates the value of the high-loss d-axis current command Id_loss by adding the amount of variation ΔId in d-axis current command Id* calculated in step #303 to the high-loss d-axis current command Id_loss which is the value of the current d-axis current command Id* (#307). Next, the difference between the updated high-loss d-axis current command Id_loss and the d-axis current command Id* obtained with reference to the current command map is obtained as a field regulation value Id_AFR for the d-axis current (#308). The field regulation value Id_AFR may be treated in the same manner as the regulation value utilized in the field weakening control or the field intensifying control. Thus, functional sections prepared for the field weakening control or the field intensifying control may be commonly used for the field regulation performed in the high-loss control without adding a new computation function.

Regulating the value of the d-axis current command Id* moves an operating point on an equal torque curve. Therefore, the value of the q-axis current command Iq* is also varied. The inverter control section 11 references the current command map again on the basis of the torque command T* and the field regulation value Id_AFR for the d-axis current to acquire a high-loss q-axis current command Iq_loss (#309). The high-loss d-axis current command Id_loss calculated in step #307 and the high-loss q-axis current command Iq_loss acquired in step #309 are set as the d-axis current command Id* and the q-axis current command Iq*, respectively (#310). Step #302 to step #310 are repeated until the motor MG achieves the zero-torque control.

When step #302 to step #310 are repeated to achieve the zero-torque control for the motor MG, the process next proceeds to a convergence process #350 in which the d-axis current is varied to a current value (here, zero) at the operating point P0 corresponding to the center of the constant-current circle 200 (#302→$1). At the start of the convergence process #350, as shown in FIG. 6, a convergence d-axis current command Id_0Nm_loss is set as a variable. The high-loss d-axis current command Id_loss (current d-axis current command Id*) discussed above is substituted for the convergence d-axis current command Id_0Nm_loss (#351). It is determined whether or not the operating point has reached the center of the constant-current circle 200 (operating point P0) (#352). In the embodiment, the d-axis current at the operating point P0 is zero, and becomes closer to zero from a negative value. Thus, it is determined whether or not the d-axis current command Id* is not less than zero. If it is determined in step #352 that the d-axis current command Id* is not less than zero, the process proceeds to a normal discharge control process #357 through the No branch. The normal discharge control process #357 involves shutting down the inverter 5 (turning off all the switching elements), for example. When the normal discharge control process #357 is completed, the regenerated power suppression process #200 is terminated.

If it is determined in step #352 that the d-axis current command Id* has not reached zero, the convergence d-axis current command Id_0Nm_loss is updated by being moved in the direction of the center of the constant-current circle (operating point P0) by an amount corresponding to the amount of variation ΔId in d-axis current command Id* discussed above (#353). Next, it is determined whether or not the updated convergence d-axis current command Id_0Nm_loss is less than zero (#354). If the updated convergence d-axis current command Id_0Nm_loss is not less than zero, for example exceeds zero, the convergence d-axis current command Id_0Nm_loss has a positive value, and the operating point P0 has been exceeded. If the convergence d-axis current command Id_0Nm_loss is zero, meanwhile, the operating point P0 has just been reached. Thus, if the convergence d-axis current command Id_0Nm_loss is not less than zero, both the d-axis current command Id* and the q-axis current command Iq* are set to zero to bring the operating point to the center of the constant-current circle (operating point P0).

If the updated convergence d-axis current command Id_0Nm_loss is less than zero in step #354, it is necessary to further continue the convergence process to bring the operating point toward the center of the constant-current circle (operating point P0). Thus, the d-axis current command Id* is set to the convergence d-axis current command Id_0Nm_loss, and steps #352 to #354 are repeated (#355). Because the zero-torque control has already been achieved, the q-axis current command Iq* is set to a value of zero (#355). The q-axis current command Iq* may be set with reference to the current command map on the basis of the torque command T* and the convergence d-axis current command Id_0Nm_loss (d-axis current command Id*) as in step #309 in FIG. 5.

Besides the processes shown in the flowcharts of FIGS. 3 to 6, the inverter control section 11 may also be configured to execute shut-down control on the inverter 5 in the case where the voltage between the terminals of the second smoothing condenser Q2, that is, the system voltage Vdc, becomes equal to or more than a predetermined overvoltage threshold. In this event, the overvoltage threshold is larger than the determination threshold TH1 used in step #102 in FIG. 3. Here, in the shut-down control, all the switching elements E3 to E8 forming the inverter 5A and all the switching elements E9 to E14 forming the inverter 5B are switched off. With the inverter 5 shut down, the current from the motor MG flows back through the free-wheel diodes D3 to D14, which are connected in inverse parallel with the switching elements E3 to E14, to be gradually reduced.

According to the present invention, as has been described above, it is possible to immediately reduce regenerated power fed from the motor MG via the inverter 5 in the case where connection between the drive device 1 including the inverter 5 and the battery 3 is blocked. Specifically, the inverter control section 11 can immediately reduce regenerated power by executing the zero-torque control and the high-loss control using the field current. When a further transition is made to the zero-torque control, the restriction value for the torque variation rate is increased to allow a high torque variation rate compared to that during normal control so that regenerated torque is immediately reduced at a high torque variation rate compared to that during normal control. Thus, it is possible to immediately reduce regenerated power compared to the technique according to the related art. For example, even if the capacitance of the smoothing condenser (Q2) is reduced to achieve space saving and cost reduction of the control device 10, it is possible to suppress a rise in system voltage Vdc (voltage between the terminals of the smoothing condenser) to a degree that is equal to or more than that in the related art.

OTHER EMBODIMENTS

Other embodiments of the present invention will be described below. The configuration of each embodiment described below is not limited to its independent application, and may be applied in combination with the configuration of other embodiments unless any contradiction occurs.

Figure 7:
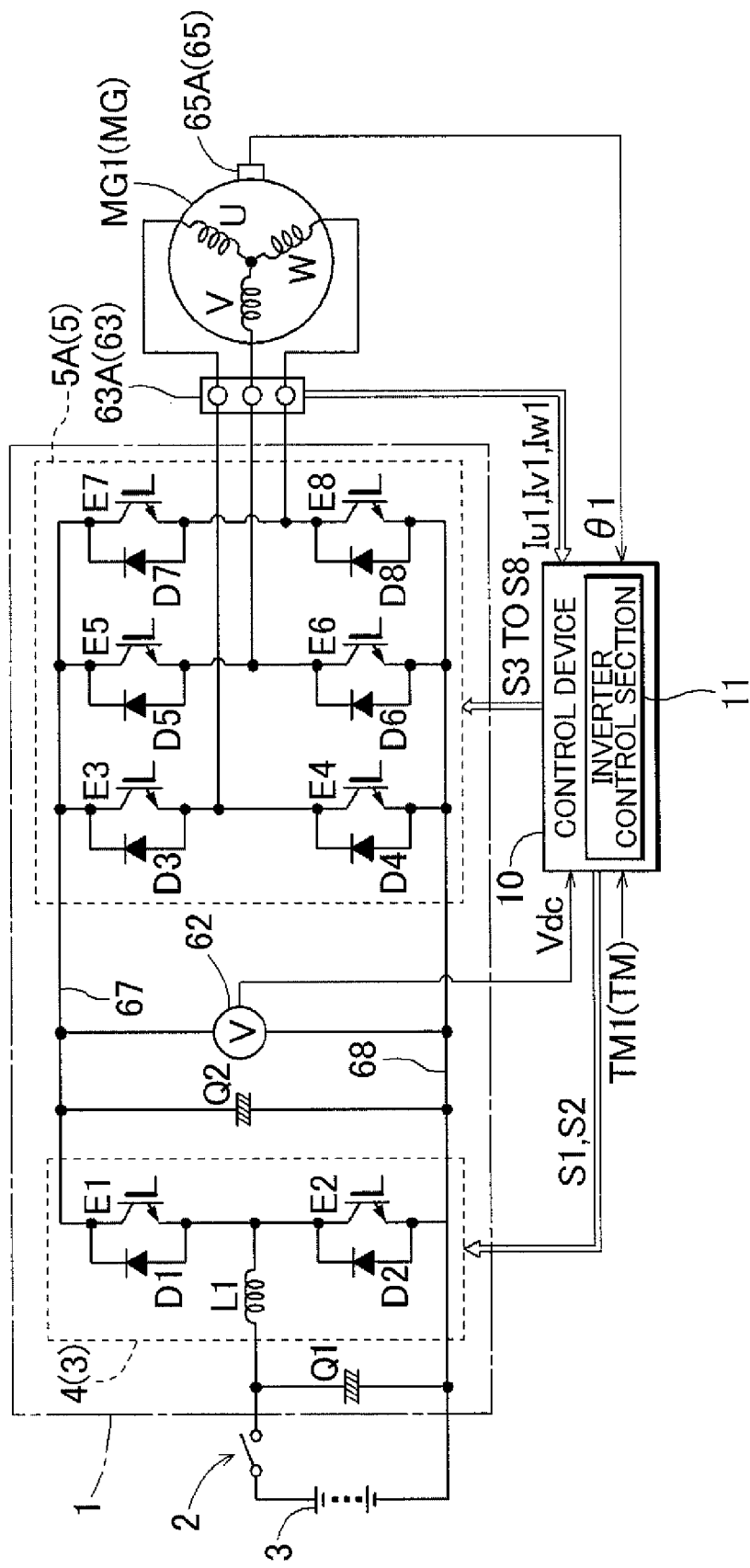
FIG. 7 is a block diagram schematically showing another configuration example of the rotary electric machine drive device.
Figure 8:
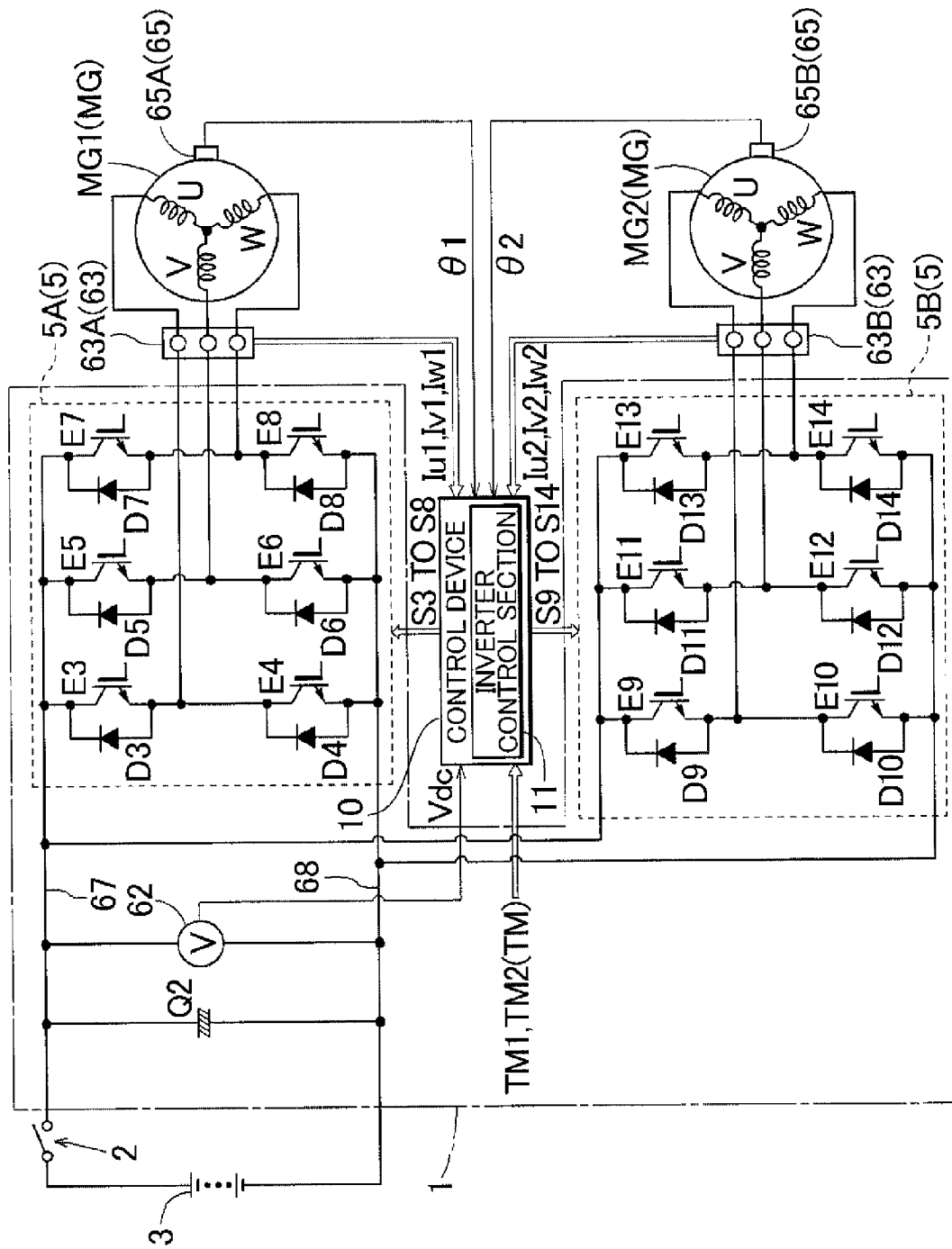
FIG. 8 is a block diagram schematically showing still another configuration example of the rotary electric machine drive device.

(1) In the embodiment described above, the present invention is applied to a rotary electric machine control device that controls a drive device (rotary electric machine drive device) for a hybrid vehicle of a 2-motor split type. However, the present invention is not limited thereto. As shown in FIG. 7, the present invention may be applied to a rotary electric machine control device that controls a drive device that drives one rotary electric machine. In the embodiment described above, in addition, the drive device 1 includes the converter 4. However, the drive device 1 may be formed to include no converter as shown in FIG. 8.

(2) In the embodiment described above, the d-axis current (field current) which does not contribute to torque is increased to increase a loss in the high-loss control. However, those skilled in the art may increase a loss by other methods to reduce regenerated power. For example, increasing the modulation frequency (carrier frequency) for PWM control increases the number of switchings per unit time to increase a loss. The present invention is technically characterized in executing the zero-torque control and the high-loss control using the field current. However, the present invention does not exclude increasing a loss by other methods.

The present invention may be applied to a rotary electric machine control device that controls a rotary electric machine drive device including an inverter interposed between a DC power source section including a power storage device and an AC rotary electric machine to perform power conversion between DC power from the DC power source section and AC power for the rotary electric machine.

The invention claimed is:

1. A rotary electric machine control device that controls a rotary electric machine drive device including an inverter interposed between a DC power source section including a power storage device and an AC rotary electric machine to perform power conversion between DC power from the DC power source section and AC power for the rotary electric machine, the rotary electric machine control device comprising:

an inverter control section that controls the inverter by controlling an armature current in a two-axis orthogonal coordinate system that rotates in synchronization with rotation of the rotary electric machine, the armature current being a vector obtained by synthesizing a field current and a drive current extending along respective axes of the orthogonal coordinate system, wherein the inverter control section determines whether connection between the DC power source section and the inverter is in a blocked state, and if it is determined that the connection is in the blocked state, the inverter control section executes zero-torque control in which the inverter is controlled such that torque regenerated by the rotary electric machine becomes zero, and executes high-loss control in which the field current is increased while reducing the drive current to zero so as to increase the armature current while maintaining a torque command provided in the zero-torque control.

2. The rotary electric machine control device according to claim 1, wherein in executing the zero-torque control in the blocked state, the inverter control section sets a restriction value for a torque variation rate at which the torque regenerated by the rotary electric machine is reduced to zero to be larger than a restriction value for the torque variation rate with the connection between the DC power source section and the inverter maintained.

3. The rotary electric machine control device according to claim 1, wherein in executing the zero-torque control in the blocked state, the inverter control section variably sets a torque variation rate at which the torque regenerated by the rotary electric machine is reduced to zero in accordance with a rotational speed of the rotary electric machine.

4. The rotary electric machine control device according to claim 1, wherein:

the inverter includes a plurality of switching elements and free-wheel diodes connected in parallel with respective ones of the switching elements; and in the case where a voltage between terminals of a smoothing condenser becomes equal to or more than a predetermined overvoltage threshold with the smoothing condenser kept connected between positive and negative DC terminals of the inverter even after the blocked state is established, the inverter control section executes shut-down control in which all the switching elements forming the inverter are turned off.

5. The rotary electric machine control device according to claim 2, wherein in executing the zero-torque control in the blocked state, the inverter control section variably sets the torque variation rate at which the torque regenerated by the rotary electric machine is reduced to zero in accordance with a rotational speed of the rotary electric machine.

6. The rotary electric machine control device according to claim 2, wherein:

the inverter includes a plurality of switching elements and free-wheel diodes connected in parallel with respective ones of the switching elements; and in the case where a voltage between terminals of a smoothing condenser becomes equal to or more than a predetermined overvoltage threshold with the smoothing condenser kept connected between positive and negative DC terminals of the inverter even after the blocked state is established, the inverter control section executes shut-down control in which all the switching elements forming the inverter are turned off.

7. The rotary electric machine control device according to claim 3, wherein:

the inverter includes a plurality of switching elements and free-wheel diodes connected in parallel with respective ones of the switching elements; and in the case where a voltage between terminals of a smoothing condenser becomes equal to or more than a predetermined overvoltage threshold with the smoothing condenser kept connected between positive and negative DC terminals of the inverter even after the blocked state is established, the inverter control section executes shut-down control in which all the switching elements forming the inverter are turned off.

8. The rotary electric machine control device according to claim 5, wherein:

the inverter includes a plurality of switching elements and free-wheel diodes connected in parallel with respective ones of the switching elements; and in the case where a voltage between terminals of a smoothing condenser becomes equal to or more than a predetermined overvoltage threshold with the smoothing condenser kept connected between positive and negative DC terminals of the inverter even after the blocked state is established, the inverter control section executes shut-down control in which all the switching elements forming the inverter are turned off.

* * * * *